(12) United States Patent
Granatelli et al.

(10) Patent No.: US 7,376,712 B1
(45) Date of Patent: May 20, 2008

(54) METHOD AND SYSTEM FOR REMOTELY MONITORING TIME VARIANT DATA

(75) Inventors: David B. Granatelli, Lilyfield (AU); Michael David Higgins, Applecross (AU)

(73) Assignee: Honeywell Limited, North Ryde, New South Wales (AU)

( * ) Notice: Subject to any disclaimer, the term of this patent is extended or adjusted under 35 U.S.C. 154(b) by 802 days.

(21) Appl. No.: 10/111,125

(22) PCT Filed: Jun. 9, 2000

(86) PCT No.: PCT/AU00/00658

§ 371 (c)(1), (2), (4) Date: Apr. 19, 2002

(87) PCT Pub. No.: WO00/77584

PCT Pub. Date: Dec. 21, 2000

(30) Foreign Application Priority Data

Jun. 11, 1999 (AU) .................................... PQ0945

(51) Int. Cl.
*G06F 15/16* (2006.01)

(52) U.S. Cl. ........................ 709/219; 702/188
(58) Field of Classification Search ................ 709/222, 709/224, 229, 219, 200–203; 710/106, 109, 710/105; 717/109; 702/183–184, 188
See application file for complete search history.

(56) References Cited

U.S. PATENT DOCUMENTS

| | | | |
|---|---|---|---|
| 5,463,735 A | * | 10/1995 | Pascucci et al. ............ 709/222 |
| 5,619,656 A | * | 4/1997 | Graf ............................ 709/224 |
| 5,774,661 A | | 6/1998 | Chatterjee et al. |
| 5,862,054 A | | 1/1999 | Li |
| 5,862,346 A | | 1/1999 | Kley et al. |
| 5,862,391 A | | 1/1999 | Salas et al. |
| 5,909,545 A | | 6/1999 | Frese, II et al. |

(Continued)

FOREIGN PATENT DOCUMENTS

DE   195 32 927   2/1997

(Continued)

*Primary Examiner*—Moustafa Meky
(74) *Attorney, Agent, or Firm*—Henricks, Slavin & Holmes LLP (57) ABSTRACT

A system (100) and method for remotely monitoring and controlling time variant data in an industrial plant (400). The system (100) includes a local server (102) and at least one remote server (104). The local server (102) includes a local server cache (206), a local controller (308), and a local operator station (1001). Each remote server (104) includes a remote server cache (901) and a remote controller (903). Wherein the local server cache (206) stores a plurality of data units (304), and the local controller (308) provides updated units (902) to the local server cache (206). Each remote server cache (901) stores a plurality of data units (902), and each remote controller (903) provides updated data units (902) to its corresponding remote server cache (901). The method operates such that each cache (206, 901) buffers controllers (308) and other servers (104) from unnecessary data requesting transactions, minimizing the data traffic in the system (100). A communication network hardware in the form of a Wide Area Network (WAN) (106) interconnecting all the servers (102, 104), and a unique data point identifier (204) associated with the at least one remote server (104) are also disclosed.

19 Claims, 7 Drawing Sheets

U.S. PATENT DOCUMENTS

| | | | |
|---|---|---|---|
| 5,938,752 A * | 8/1999 | Leung et al. | 710/106 |
| 5,961,604 A * | 10/1999 | Anderson et al. | 709/229 |
| 5,987,621 A | 11/1999 | Duso et al. | |
| 5,988,847 A | 11/1999 | McLaughlin et al. | |
| 6,088,717 A | 7/2000 | Reed et al. | |
| 6,412,026 B1 * | 6/2002 | Graf | 710/18 |
| 6,438,742 B1 * | 8/2002 | McCann et al. | 717/109 |
| 6,449,640 B1 * | 9/2002 | Haverstock et al. | 709/219 |
| 6,546,418 B2 * | 4/2003 | Schena et al. | 709/219 |
| 6,564,253 B1 * | 5/2003 | Stebbings | 709/217 |
| 6,567,411 B2 * | 5/2003 | Dahlen | 370/401 |

FOREIGN PATENT DOCUMENTS

| | | |
|---|---|---|
| EP | 0 622 714 | 11/1994 |
| WO | WO-98/55934 | 12/1998 |
| WO | WO 99 15950 | 4/1999 |

* cited by examiner

Figure 5 - Point T406

| Point Property | Value |
|---|---|
| Name | T406 |
| Description | Methane Storage Tank |
| Area | A1 |
| CreateTime | 10:20 1/3/99 |
| CurrentVolume | 31000.23 cubic meters |
| CurrentTemperature | 290 Kelvin |
| AlarmStatus | HiTemp |
| HighTempLimit | 280 Kelvin |
| HiHighTempLimit | 300 Kelvin |
| DetailDisplayName | StorageTank.dsp |
| GroupDisplayName | StorageTankGroup.dsp |

Figure 6 - Point V401

| Point Property | Value |
|---|---|
| Name | V401 |
| Description | Methane outlet control valve |
| Area | A1 |
| CreateTime | 10:20 1/3/99 |
| PresentValue | 22.23 cubic meters per hour |
| SetPoint | 22.34 cubic meters per hour |
| DetailDisplayName | ButterFlyValve.dsp |
| GroupDisplayName | ButterFlyValveGroup.dsp |
| Mode | Automatic |
| Output | 20% |

Figure 7 - Alarm from T406

| Alarm Property | Value |
|---|---|
| DateTime | 10:03PM 9/6/99 |
| PointName | T406 |
| Priority | Urgent |
| AlarmType | HighTemperature |
| Value | 290 |
| Acknowledged | No |
| ReturnToNormal | No |
| Limit | 280 |

Figure 8 - METADATA for T406

| Request | Value |
|---|---|
| Get parameter names | Name, Description, Area, CreateTime, CurrentVolume, CurrentTemperature, AlarmStatus, HighTempLimit HiHighTempLimit, DetailDisplayName, GroupDisplayName |
| Get parameter data types | String, String, String, Date, Number, Number, String, Number, Number, String, String |
| Get quality of parameters | Ok,ok,ok,ok,ok,ok,ok,ok,ok,ok,BAD, InAlarm |
| List enumerations of mode | Automatic, Manual, Cascade |
| Get range of Current Temperature | 0 to 400 |
| Get how much to raise Current Temperature | +10 increments |
| Get length of Name | 4 character |

METHOD AND SYSTEM FOR REMOTELY MONITORING TIME VARIANT DATA

FIELD OF INVENTION

The present invention relates to the field of remote data monitoring.

The invention has been developed primarily for use in remote monitoring and control of industrial plant, and will be described hereinafter with reference to this application. However, it will be appreciated by those skilled in the art that the invention is not limited to this field of use.

BACKGROUND

Remote monitoring of data from centralised observation areas is frequently used in industrial and manufacturing situations where it is desirable to closely monitor and, ideally, control, various systems and systems elements within those situations. The type of data to be monitored varies, and can include pressures, flow-rates, temperatures, items processed per unit time, or even access and security associated with a controlled area. The use of one or more central observation areas reduces the need for direct observation of individual system elements by human operators. Moreover, the collection of data from multiple sources within a particular system enables instantaneous detection of faults or error conditions, as well as allowing processing of data from multiple sources to obtain better information about system operation at a higher level.

Remote monitoring of data requires considerable infrastructure development. For example, in the case of a gas production plant, it is typically necessary to provide many or even all major valves with transducers that measure desired information such as temperature and gas flow rates. The transducers are in turn connected to controllers that can filter or otherwise manipulate the raw transducer data into a form useable by a remote monitoring server. The manipulation can include, for example, amplification and analog to digital conversion of the data from the transducer.

Frequently, the controllers are also used to control the components about which the transducers are measuring data. For example, a controller can filter, amplify and analog to digital convert data provided from a flow rate sensor adjacent a valve, whilst controlling throttling of the valve in accordance with instructions from a remote server. Other components within the system to be monitored will similarly require appropriate transducers to provide data to a central observation area.

Typically, the data is supplied to one or more data servers in digital form, the controller output representing the transducer being sampled periodically by the server and the resultant data values being stored in memory. In some cases, a predetermined number of samples are buffered by the server to ensure some historical data is available at all times to an operator. The data can be stored as a "point" on the server, the point simply being a structured object, containing accessible data. Usually, a point is stored in random access memory ("RAM") or on a hard disk drive associated with the server.

Frequently, it is desirable to use a relatively large-scale centralised control room to monitor (and sometimes control) many different areas of plant or even many plants at once. Where the different areas or plants are remote from each other, it may be necessary to implement one or more remote servers to collect data from them all. A coordinating server can then be used to collect data from the remote servers by means of a Wide Area Network ("WAN") or direct data link, for example.

A major disadvantage with this system is the need for complete duplication of information on both the coordinating and remote servers. As each remote server is brought into the system, all of the information about each and every point on that server must be supplied to the coordinating server. This enables the coordinating server to handle a request from an operator to monitor a particular point or points on the remote servers. The coordinating server knows the correct address and parameters of each and every point on the network and can therefore access them as required.

Unfortunately, to ensure correct access to a point requested by an operator, it is necessary for the coordinating server to maintain current information in relation to each and every point in the system. This means that for every new point and for every point for which a parameter changes, it is necessary to update the coordinating server so that it is aware of the change to the system. In a large system involving many components or even many remote plants, this can result in a relatively large amount of duplication of information on both the remote and coordinating servers, requiring correspondingly large inputs of time on behalf of system administrators and programmers. In addition, the communication links between servers require high bandwidths in order to handle the increased traffic flow.

With a traditional system any node requiring data refers directly to the node that owns that data. The result is that nodes typically interrogate the owning node independently, even if many nodes require the same data. When this scenario is extended to a connected sister system, or systems via a gateway or via other means, the situation just gets worse because there are simply more requesters of data.

An additional disadvantage of these prior art arrangements is that they require significant manual configuration of static data connections. Each time it is discovered that a system needs new data from another system, additional connections must be manually configured, resulting in increased engineering and maintenance. This also places a resource burden on each system, which has to mirror the full complement of all data required from other systems. While creating a bad situation with just two systems, connecting three or more systems becomes very unmanageable.

It is an object of the present invention to overcome or at least substantially ameliorate one or more of the disadvantages of the prior art.

It will be appreciated by those skilled in the art that the embodiments of the invention described in the detailed description provide other advantages over prior monitoring and control systems.

SUMMARY

According to a first aspect of the present invention there is disclosed a system for remotely monitoring time variant data including:

a local server including a local server cache, a local controller, and a local operator station; and at least one remote server, each remote server including a remote server cache and a remote controller; wherein:

the local server cache stores a plurality of data units;

the local controller provides updated data units to the local server cache;

each remote server cache stores a plurality of data units; and each remote controller provides updated data units to its corresponding remote server cache.

According to a second aspect of the present invention there is disclosed a method of remotely monitoring time variant data using a system as defined in claim 1 wherein, when the local operator station wishes to subscribe to a selected data unit, the system performs the steps of:

(a) sending a selected data unit request from the local operator station to the local server; and (b) determining whether the selected data unit is stored in the local server cache.

Preferably, the selected data unit is stored in the local server cache, and, having determined same, the system performs the step of:

(c) sending the selected data unit from the local server cache to the local operator station.

Alternatively, the selected data unit is not stored in the local server cache, and, having determined same, the system performs the step of:

(c) determining whether the selected data unit is provided by the local controller.

Preferably, the selected data unit is provided by the local controller, and, having determined same, the system performs the steps of:

(d) providing the selected data unit from the local controller to the local server cache; and (e) sending the selected data unit from the local server cache to the local operator station.

Alternatively, the selected data unit is not provided by the local controller, and, having determined same, the system performs the step of:

(d) determining which remote controller the selected data unit is provided by.

Preferably, the selected data unit has a corresponding selected data unit identifier; wherein the selected data unit is provided by a found remote controller;

and wherein the found remote controller is associated with
  a found remote server, the server including:
  a found remote server cache; and
  a found remote server subscription list which stores the data unit identifiers of the data units to which any server has subscribed and which are stored in the found remote server cache;

and, having determined that the selected data unit is provided by the found remote controller, the system performs the steps of:

(e) sending the selected data unit request from the local server to the found remote server; and (f) determining whether the selected data unit is stored in the found remote server cache.

Preferably, the selected data unit is stored in the found remote server cache, and, having determined same, the system performs the steps of:

(g) sending the selected data unit from the found remote server cache to the local server cache; and (h) sending the selected data unit from the local server cache to the local operator station.

Alternatively, the selected data unit is not stored in the found remote server cache, and, having determined same, the system performs the steps of:

(g) adding the selected data unit identifier to the found remote server subscription list;

(h) providing the selected data unit from the found remote controller to the found remote server cache;

(i) sending the selected data unit from the found remote server cache to the local server cache; and (j) sending the selected data unit from the local server cache to the local operator station.

According to a third aspect of the present invention there is disclosed a method of remotely monitoring time variant data by means of a subscribing server and one or more publishing servers interconnected by communications network hardware, the method including the steps of:

(a) establishing data points associated with the time variant data, each data point being disposed on one of the publishing servers and having a relatively unique identifier associated with it;

(b) providing each of the publishing servers on which a data point has been established with an address of the subscribing server;

(c) providing the subscribing server with the unique identifiers of the data points and addresses of the publishing servers; and (d) selecting a first data point to be subscribed to by the subscribing server;

(e) searching the publishing servers for the unique identifier associated with the first data point; and (f) upon locating the first data point, using the subscribing server to remotely monitor the time variant data associated therewith via the communications network hardware.

Preferably, upon locating the first data point, address data linking the first data point with the publishing server associated with it is recorded by the subscribing server, such that, upon subsequent selection of the first data point for remote monitoring, the first publishing server is the first of the publishing servers searched in step (e).

Preferably, as data points are located on publishing servers by the subscribing server, the subscribing server records at least the address of the publishing server on which that data point is disposed. Preferably, as data points are located, the corresponding publishing servers provide the subscribing server with other parameters associated with the respective data points.

In a second aspect, the present invention provide a system for remotely monitoring time variant data, the system including:

a plurality of publishing servers, upon each of which at least one data point associated with time variant data is established, each data point having a relatively unique identifier associated with it;

a subscribing server storing the unique identifiers of the data points and addresses of the publishing servers, each of the publishing servers including an address of the subscribing server;

a communications network interconnecting the subscribing and publishing servers; and data selection means enabling a user or other system to select a first data point to be subscribed to by the subscribing server;

the system being configured such that, upon selection of a first data point via the data selection means, the subscribing server searches the publishing servers to locate the unique identifier associated with the first data point, and, upon locating the first data point, the subscribing server remotely monitors the time variant data associated therewith via the communications network.

Other exemplary aspects of the invention are set out in the numbered paragraphs at the end of this specification.

BRIEF DESCRIPTION OF DRAWINGS

Preferred embodiments of the invention will now be described, by way of example only, with reference to the accompanying drawings, in which.

DETAILED DESCRIPTION

Figure 1:
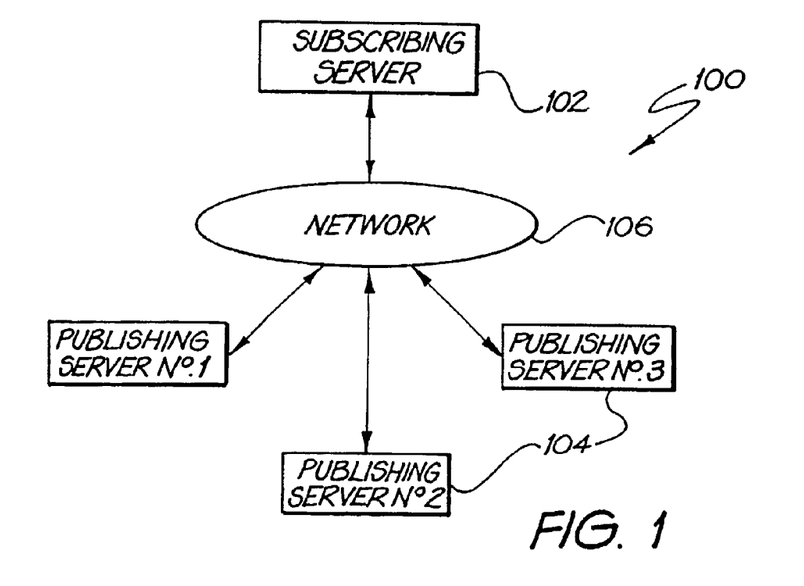
FIG. 1 is a schematic diagram of a system for remote monitoring time variant data, in accordance with the invention.

Referring to the drawings, there is shown a system 100 for remotely monitoring time variant data by means of a subscribing server 102 and a plurality of publishing servers 104. The subscribing server 102 and publishing servers 104 are interconnected by communications network hardware in the form of a Wide Area Network (WAN) 106.

It will be appreciated that the various servers can take any suitable form, in terms of both hardware and operating system specification. For example, one or more of the servers can take the form of an IBM compatible PC, Sparc Station, Apple Macintosh, or any other hardware platform. Similarly, the various platform or platforms utilised by the servers can run any suitable operating system, such as Windows 95, Windows NT, OS/2, Unix or the like.

Figure 2:
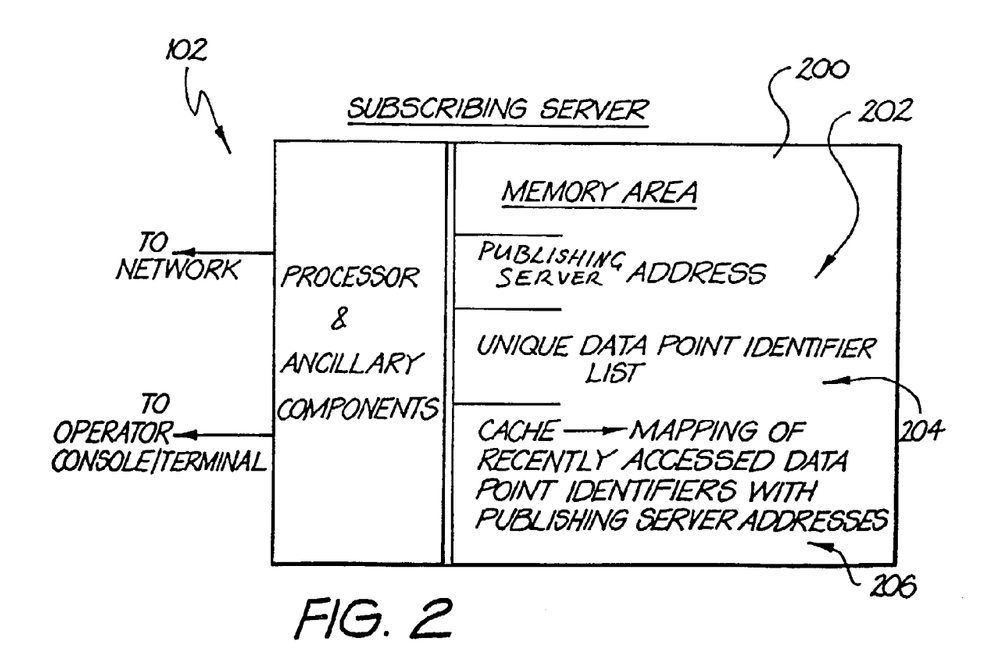
FIG. 2 is a detailed schematic diagram of one of the subscribing server shown in FIG. 1.

Turning to FIG. 2 the subscribing server 102 is shown in greater detail. It will be appreciated that many of the components required to operate a computer server are omitted for the sake of clarity, including elements such as the central processing unit ("CPU"), hard and floppy disk drives, CD-ROM and DVD drives, other storage media, output interfaces such as video displays and printers, and input interfaces such as keyboards and mouse or trackball controllers.

A memory area 200 of the subscribing server 102 stores a number of pieces of information allowing it to communicate effectively with the publishing servers 104 in accordance with the preferred embodiment. This information includes publishing server addresses 202 associated with the publishing servers 104 of interest. The publishing server addresses 202 can be supplied to the subscribing server 102 manually by means of an operator, or can alternatively be forwarded via the WAN by respective publishing servers 104 as they enter the system 100.

The memory area 200 also includes a database of data point identifiers 204 (data points and their identifiers are described below). Again, the data point identifiers 204 can be supplied manually directly to the subscribing server or can be provided across the WAN by respective publishing servers 104 as they enter the system 100. The subscribing server also includes one or more control terminals associated with it that can both extract data received by the subscribing server and send instructions via the subscribing server to the publishing server.

Figure 3:
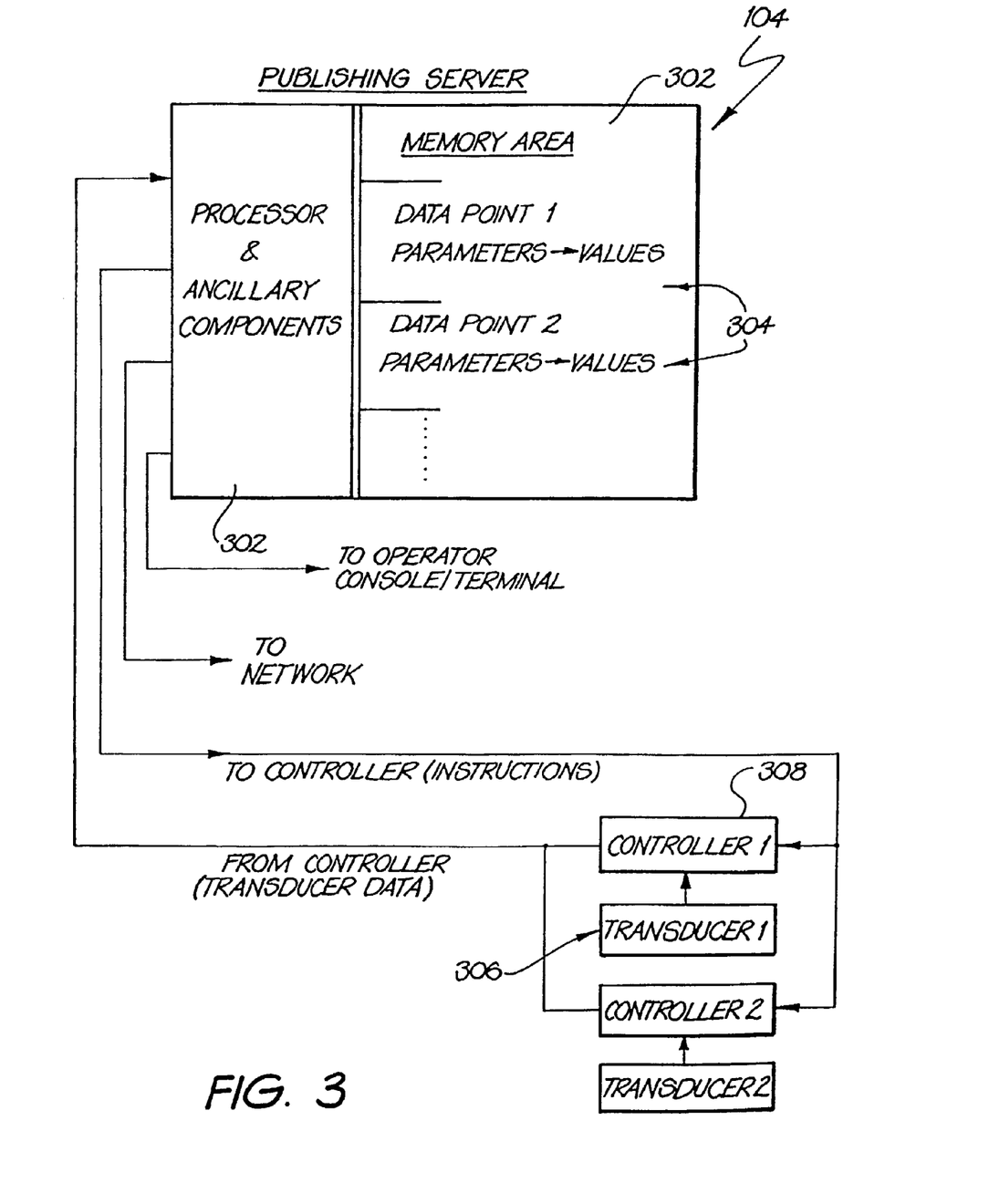
FIG. 3 is a detailed schematic diagram of one of the publishing servers shown in FIG. 1.

Turning to FIG. 3, each publishing server 104 also includes a memory area 300, along with a processor and ancillary devices 302, which will typically be similar to those associated with the subscribing server 102. The memory area 300 initially includes one or more data points 304, each of which has at least one value associated with it. Data points can be considered objects in memory and can take the form of, for example, analog points (being digital representations of analog data), accumulator points and status points, or any known point structure. Each data point has time variant data associated with it. The data can be as simple as an alarm status or an instantaneous value associated with a remote transducer, as discussed below. In more complicated embodiments, a point can represent an output of a function having any number of desired inputs. The inputs can include data from transducers or databases, or even values extracted from other data points.

In the preferred embodiment, at least some of the data points 304 relate to real world information supplied from corresponding transducers 306 which are linked to the publishing server 104 by means of appropriate sampling and filtering hardware in the form of controllers 308 that convert an output signal from a transducer into a value storable at a respective data point 304 located on the publishing server 104.

In use, when the system 100 is first established or initialised, in the preferred form there is no information linking particular data point identifiers 204, and thereby data points, with particular publishing servers 104. In the preferred embodiment, an operator of the subscribing server (or of a terminal associated therewith) is presented with a text field into which a data point identifier can be entered. A SEARCH/RETRIEVE function key is pressed ("F12" in the preferred embodiment), and the subscribing server 102 then contacts each of the publishing servers in turn to find the location of that data point identifier. It will be appreciated that the precise method by which the desired data point identifier is selected on the subscribing server or associated terminal is not critical to the invention. For example, a directory or tree structure could be provided, hierarchically grouping different types of data point identifier together for selection by keystroke. In this and other embodiments, the required data point can be selected by use of a mouse or other pointing device.

Once the correct publishing server has been ascertained, a link is established with that publishing server to access the data point associated with the selected data point identifier. In the preferred embodiment, once the correct publishing server has been identified, the subscribing server also requests information from the publishing server as to how the information from the data point of the unique data point identifier should be displayed to the operator of the subscribing server. For example, the publishing server can indicate a particular page or template stored on the subscribing server suitable for displaying the information in the data point on the publishing server. Alternatively, the publishing server can supply the subscribing server with a suitable page or template, preferably using a generic or proprietary page description language.

Preferably, once the page or display template has been selected or received by the subscribing server, the subscribing server uses field descriptors or other information in the page or template to ascertain what additional information needs to be requested from the publishing server to provide the operator with appropriate details of the data point. In yet other embodiments, all the information from the data point, including the live information, is supplied automatically to the subscribing server by the publishing server upon which the desired data point has been found.

Once the publishing server upon which the data point of interest is located has been found, the subscribing server stores the mapping between the two within a cache 206 in the memory area 200. In this way, the next time that data point is requested by an operator of the subscribing server, the search for the data point can commence with the mapped publishing server address in the cache 206. The cache can also be used to store current live data from the mapped publishing server, as well as the parameters and any metadata (both discussed below) associated with the data point. The cache can therefore provide a default model of the data point that can be updated the next time the data point is accessed via the subscribing server. In addition, the mapped publishing server address in the cache 206 is deleted when the subscribing server detects that the data point has been deleted from the publishing server.

The publishing server can also store historical data in relation to its data points. This historical data is then supplied to the subscribing data upon request. For example, upon receiving an alarm notification, the subscribing server or its operator may wish to ascertain conditions leading up to the event that caused the alarm to be generated. By requesting historical data in relation to the relevant data point or an element thereof, these historical conditions can be reconstructed.

It will be appreciated that one of the advantages provided by the invention, at least in preferred forms, is a reduction in data flow across the interconnecting network. This is because information is only sent between servers upon request, so information that is rarely accessed is only updated to the subscribing server when required.

Data points 304 can also define an alarm status associated with either a binary output of a transducer, or a result of a function applied to a transducer output or data generated therefrom. For example, a reed switch installed to detect entry through a doorway provides a binary ON or OFF output that can be sent to a publishing server by an associated controller for storage at a data point for subsequent interrogation. Alternatively, in the case of, for example, a transducer detecting a flow rate through a pipe, a particular data point can raise an alarm flag within a predetermined data point if the flow rate exceeds a predetermined safe or desirable range of values.

Another aspect of the preferred embodiment is the ability to configure the system 100 to "push" data or alarm notifications from any of the publishing servers to the subscribing server if predetermined conditions arise. For example, the subscribing server can instruct a particular publishing server to push data from a data point to the subscribing server in the event that a particular alarm flag is raised in response to predetermined conditions. The publishing server can also be instructed to push other parameters associated with the data point being pushed.

Figure 4:
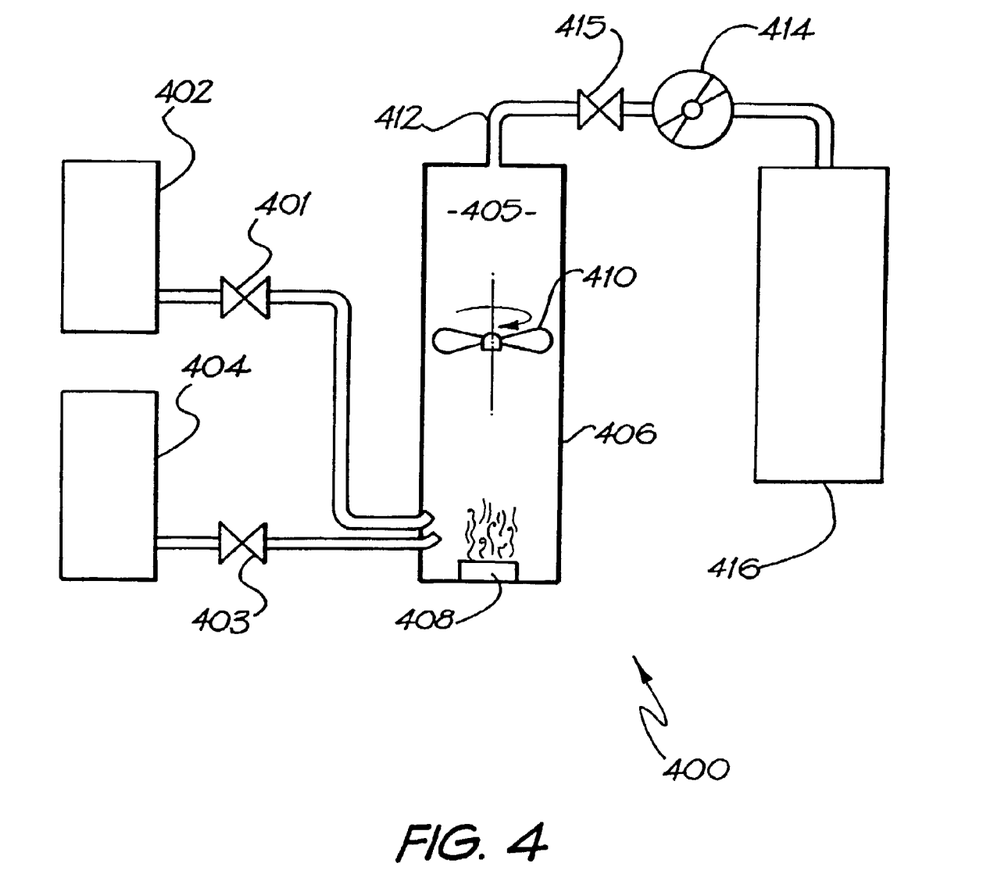
FIG. 4 is a schematic view of an exemplary gas processing plant to be monitored and controlled by the system of the invention.

A more specific embodiment of the invention will now be described in relation to FIG. 4. A gas processing plant 400 includes two raw materials storage tanks 402 and 404 which supply raw materials to a mixing and heating tank 406 via respective gas control valves 401 and 403. Gas-powered heater 408 is disposed in the base of the mixing and heating tank 406, and an agitator 410 in the form of a multi-bladed fan rotates within a central area of the mixing and heating tank.

As the raw gases are mixed, heated and processed, they rise to an upper area 405 of the mixing and heating tank 406, where they are extracted by pipe 412. Extraction via the pipe 412 is assisted by a pump 414 and controlled by a valve 415. The processed gas is then moved to an interim storage tank 416 for later extraction.

Each of the valves and tanks, and the heater and the pump, has one or more transducers (not shown, for clarity) associated with it. The respective transducers are designed to provide specific real-time data in relation to a preselected aspect of its associated component's operation. For example, the valves in the present case have transducers for flow rate, but in other embodiments measure parameters such as temperature, pressure, volume or any other desired characteristic of the gases flowing through them. Similarly, a transducer associated with the heater will usually measure temperature, whilst the pump's transducers measure the rotational rate of the pump and the rate at which gas is being pumped. The particular transducers used in particular circumstances are well known within the art, and so are not discussed within this specification.

Each transducer will usually have a controller (again, not shown, for clarity) associated with it for amplifying and filtering the raw transducer output signal as required, as well as an analog to digital converter for placing the output into a form more suitable for storage in the memory of an associated publishing server. The controller then provides the processed signal from the transducer to a local publishing server.

Non time-variant data associated with the transducer, or the component it provides data on, can either be provided to the publishing server manually by an engineer or automatically by the controller at initialisation or some predetermined interval. Time variant data, usually the processed transducer output from the controller, is supplied at predetermined intervals. The intervals can be selected depending upon the likely rates of change of the transducer output, the importance of the data and the likely rates of change of the component property being measured by the transducer.

The data from the controller is stored on the server in an appropriate data point structure for retrieval by a subscribing server.

The controllers associated with the various transducers can also, in many cases, implement control instructions from the publishing server, or another instruction source. For example, if the mixed and heated gases in the mixing and heating tank are not being extracted quickly enough, the publishing server (or another instruction source) can instruct the controller associated with the pump 414 to increase the pump's speed.

The publishing server, and others like it, is connected to a communications network, which in turn is connected to a subscribing server. Operators of the subscribing server can access the information in the respective data points, as described above. For example, an operator may be interested in finding out information on the first raw materials storage tank 402, with the unique name T406. The unique name T406 is entered by the operator into a text field, and function key F12 (in this case) is pressed to initiate the process of searching the publishing servers on the network to find where the data point named T406 is stored. Once located, the publishing server instructs the subscribing server to use a specific template to display the data and then supplies the data point information. The specific template may be stored on the publishing server, or on the subscribing server, and is accessible via the subscribing server's display search path.

Figure 5:
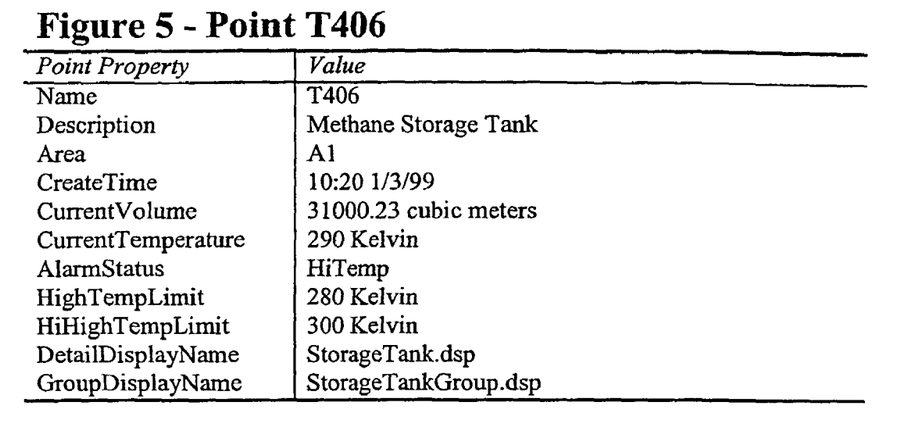
FIGS. 5 to 8 show examples of data points as supplied from publishing servers to a subscribing server in relation to the plant shown in FIG. 4.
Figure 6:
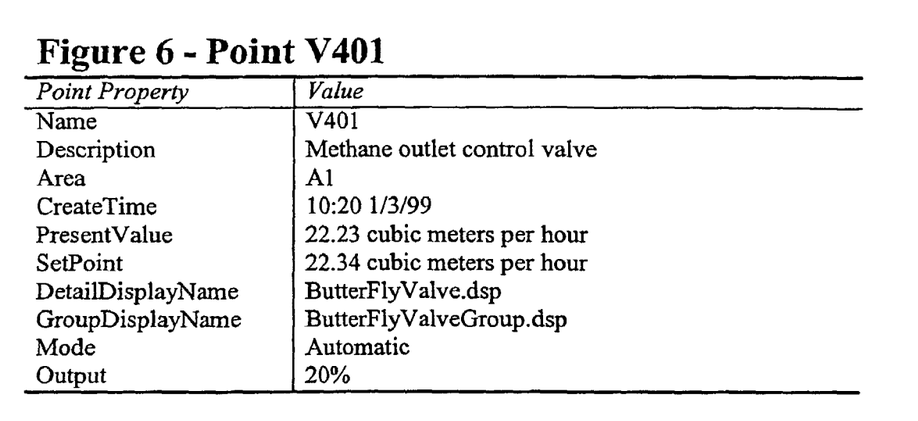

An example of the data point information at a particular point in time is shown in FIG. 5. Values like CurrentVolume, CurrentTemperature and AlarmStatus are time variant, and are therefore supplied periodically to the subscribing server from the relevant publishing server. The operator at the subscribing server or an associated terminal can also observe the non time-variant data as required. In a preferred form, the rate at which the time-variant data is updated by the publishing server can be set by an operator of the subscribing server.

In a preferred embodiment, the operator at the subscribing server or an associated terminal can also control aspects of the gas processing plant using different fields in a data point being monitored. Preferably, there is a link between at least some of the time-variant elements of a data point and components of the gas processing plant which have an effect on that element. For example, in the case of the mixing and heating tank's data point, one element is CurrentTemperature. Upon selecting this from the subscribing server, the subscribing server ascertains data points of other components that have an effect on the CurrentTemperature value of the mixing and heating tank data point. In this case, the heater is the main component of the gas processing plant that can affect the value of CurrentTemperature in the mixing and heating tank's data point. Accordingly, the heater's data point is searched for and located amongst the publishing servers, and then linked to the subscribing server to enable an operator to access the heater's controller. This linking of components that have an affect on the values of elements within other component's data points greatly simplifies the process of managing potentially complex systems and plant.

Figure 7:
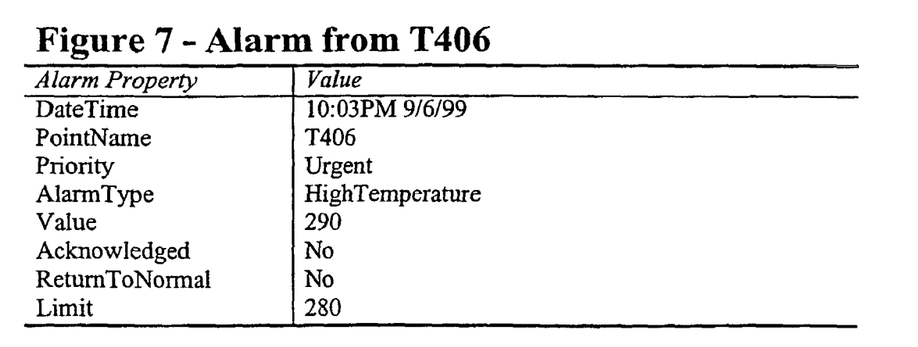

As discussed above, data points can also define an alarm status associated with either a binary output of a transducer, or a result of a function applied to a transducer output or data generated therefrom. In the example shown in FIG. 4, an alarm data point can be generated at the publishing server associated with identifier T406, as shown in FIG. 7. In this case, the alarm has arisen due to the temperature of the gas stored in the tank exceeding a predetermined temperature limit. It will be noted from the data point shown in FIG. 5 that a HighTempLimit has been set at 280 kelvin and a HiHighTempLimit has been set at 300 kelvin. Once the temperature within the tank reaches the HighTempLimit of 280 kelvin, the alarm notification shown in FIG. 7 is generated. It will be noted from the alarm notification that the temperature of the gas in the tank that generated the alarm was 290 kelvin. The alarm also records information of interest, including the date and time at which the alarm was generated, the relevant point name, whether the alarm was acknowledged by an operator and whether the value returned to normal after the alarm was notified. It will be appreciated that any combination of these and other suitable parameters can be used.

It is desirable that alarm notifications are "pushed" from the relevant publishing server when they occur. Further, it is usual for information at each data points to be processed by their associated publishing server to ascertain whether an alarm notification is necessary. The way in which an alarm is delivered to the subscribing server can be set by the subscribing server itself, or by an operator at the publishing server.

Figure 8:
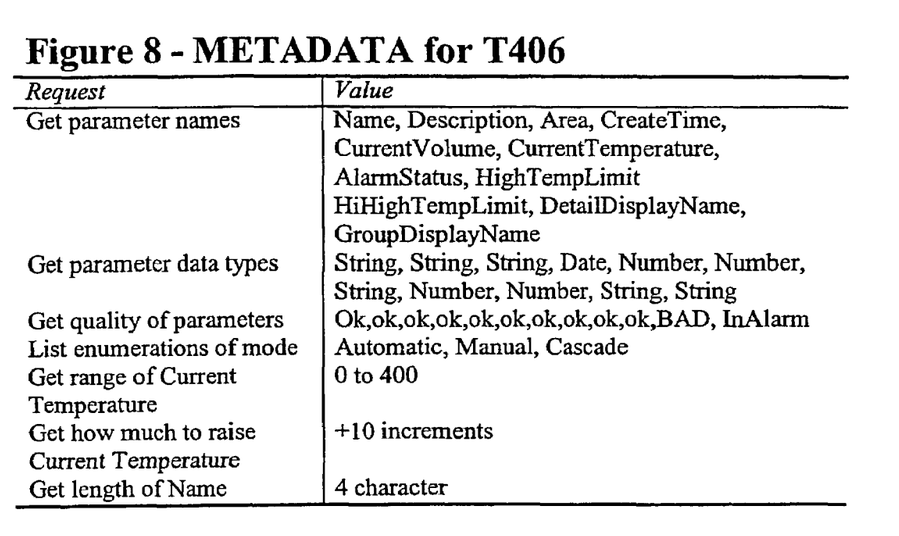

In a preferred embodiment, once the subscribing server locates the publishing server upon which a data point of interest is located, metadata associated with that data point is supplied to the subscribing server to enable it to understand data subsequently supplied to it by the publishing server. For example, as shown in FIG. 8, data point T406 includes metadata setting out each of the elements making up the data point, as well as the parameter data types, current quality of the parameters and, for example, a list of available modes for data supply. The subscribing server can use this information to understand how the data supplied in relation to the data point of interest can or must be used to ensure the operator is provided with a correct understanding of the status and values of the various data point elements. This information also informs the subscribing server of the various modes of operation it can place the data point into, as well as the types of data it can request if not supplied automatically.

An important aspect of at least a preferred embodiment of the invention is area handling, whereby different data points are grouped into logical clusters. This can be done upon instruction by the subscribing server, and enables control of access to different types of data. For example, it may be desirable to restrict access to certain types of data, or the ability to change that data, to certain operators. A particularly advantageous aspect of this particular embodiment is the ability to combine different data points from different publishing servers into logical groups that can be accessed together or to which access can be limited on a operator by operator basis. Also, responsibility for a particular area can be handed over by simply reassigning the area, rather than all of the individual data points it contains.

It will also be appreciated that more than one subscribing server can be used within a network. Indeed, a particular server can simultaneously act as a publishing server for another subscribing server as well as a subscribing server to other publishing servers.

Figure 9:
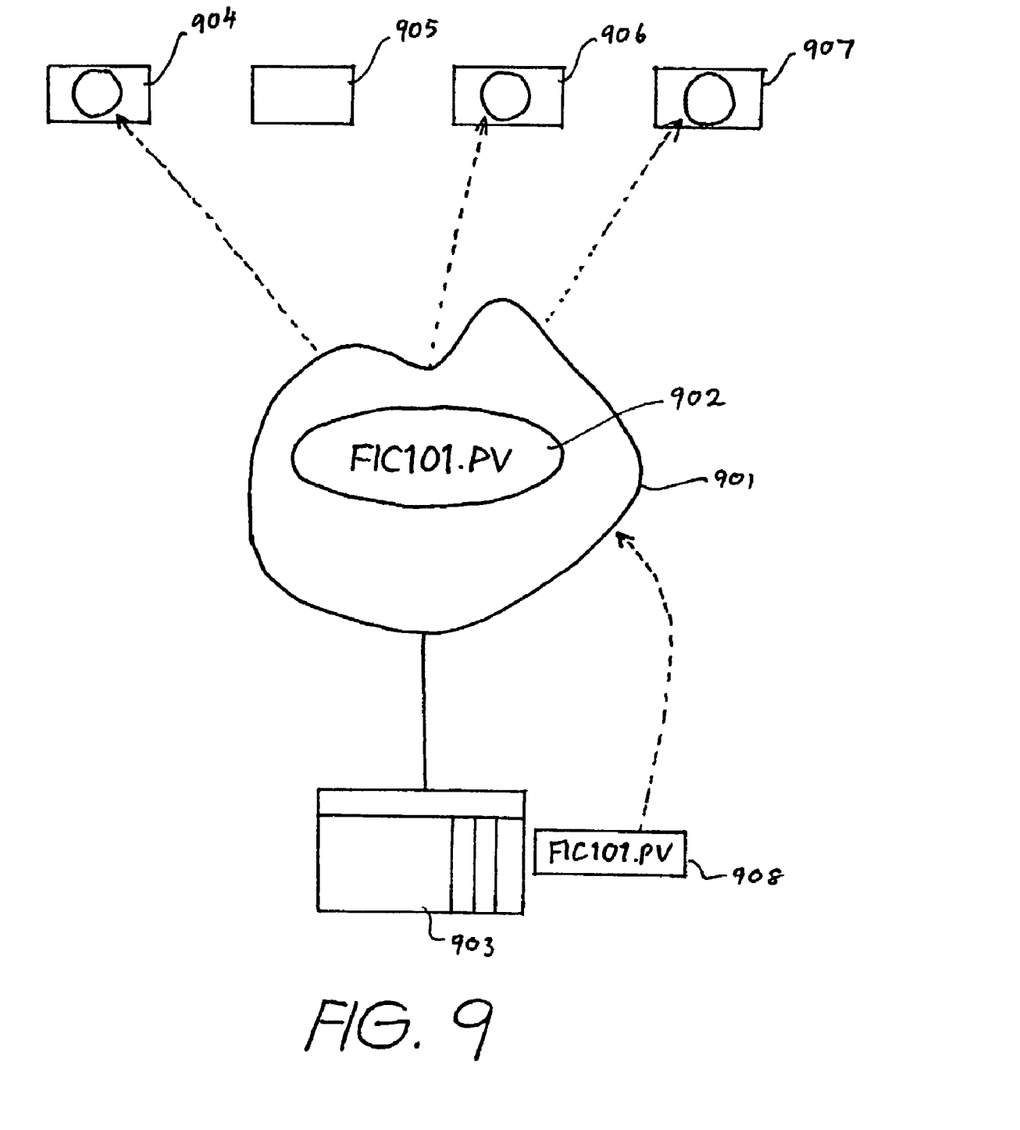
FIG. 9 is a schematic diagram illustrating the basic operation of the present invention's caching strategy.
Figure 10:
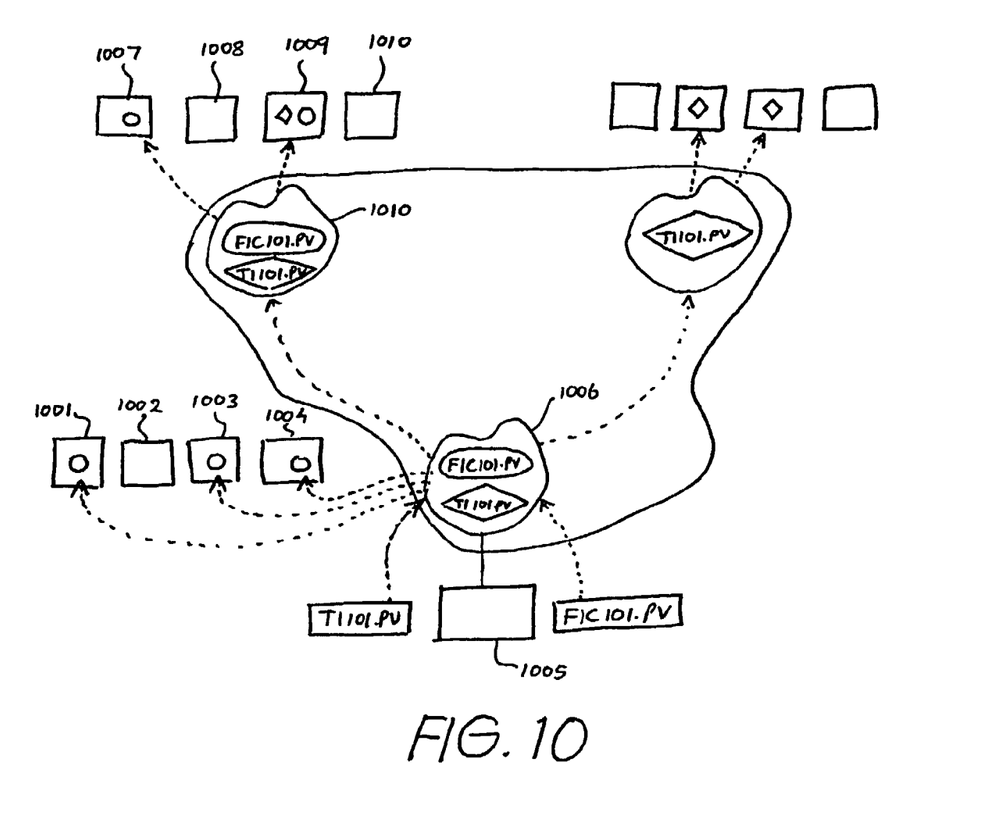
FIG. 10 is a schematic diagram illustrating how each server cache buffers controllers and other servers from unnecessary subscription transactions.

This interrelationship is perhaps more readily understood with reference to FIGS. 9 and 10.

In anticipation of the ever-increasing demand for information by users, the inventor used a next-generation approach from the outset by inserting a server-based cache between data users and the data owners. The cache forms a dynamic clearinghouse, constantly tailoring its contents based on current information demands on the system. In particular, subscriptions by multiple operator stations for common information are consolidated by the cache into a single subscription to the publishing server.

The server, as opposed to the controllers and control network, handles the direct impact of additional hits for data. This allows scalability to be increased significantly through the ever-increasing power of the PC servers. The controllers then simply publish subscribed data that is changing directly to the cache. The result is minimum load on the controllers and control network.

FIG. 9 illustrates the basic operation of the present invention's caching strategy. There we can see a server cache 901 storing cached data 902 which it receives from a connected controller 903. The server (not shown) is connected to four operator stations 904, 905, 906 and 907. In this case, operator stations 904, 906 and 907 have subscribed to the data labelled FIC101.PV. In this subscribed state, the controller 903 publishes source data 908 about point FIC101.PV to the server cache 901 whenever that source data changes. The server cache 901 updates its cached data 902 and publishes that updated data to the three subscribing operator stations 904, 906 and 907. In this way, we can see that each of the subscribing operator stations does not interrogate the controller individually. The server cache 901 supplies the information to the three operator stations 904, 906 and 907 without having to interrogate the controller 903. The controller only supplies its source data 908 to the server cache 901 when that data changes, removing the supply of unnecessary, unchanged information.

Because only changed data is sent to the operator stations currently requiring it, the supervisory network sees greatly decreased traffic loading. This feature enables operator stations to offer unparalleled performance over remote dial-up links in a true client-server fashion. Prior art systems require the use of products (such as Carbon Copy or PC Anywhere) that tie up an entire operator station back at the plant for each remote user. With the present invention, you dial into or connect over the Internet or Intranet to the system of choice, and enter your username and password. Your standard security profile is invoked independent of the location or computer you are working from—achieving true thin-client functionality.

With prior art systems, as has already been discussed, any node requiring data refers directly to the node that owns that data. The result is that nodes typically interrogate the owning node independently, even if many nodes require the same data.

In strong contrast to the architecture of prior art systems, the present invention is able to integrate multiple servers and systems in a seamless fashion. The present invention builds on the caching architecture for stand-alone server illustrated in FIG. 9 to provide transparent intersystem operations and information exchange with maximum performance and minimum impact among systems. The present invention allows applications and operator stations to subscribe not only to local points and alarms, but also to points and alarms on other remote servers, all within a single global namespace. Global historical and real-time trending is also supported.

In the case of remote server-based data, the server subscribes with the remote data-owning server, which in turn subscribes with its connected controllers, unless the required data is already being subscribed by another source and is already in the cache.

FIG. 10 shows an example of this process and how each server cache buffers controllers and other servers from unnecessary subscription transactions. The scenario depicted by the diagram is described step by step below.

Assume all the caches are empty initially

1. An operator station 1001 on Server C (not shown) subscribes to the "FIC101.PV" data, causing Server C to subscribe to the FIC101.PV data in the locally attached controller 1005. The FIC101.PV data is now published on change to the Server C's cache 1006 and is propagated out to the subscribing operator station 1001.
2. Two additional operator stations 1003 and 1004 on Server C subscribe to FIC101.PV data. Because FIC101.PV is already in the Server C's cache 1006, the two new operator stations 1003 and 1004 are simply added to the existing subscription list (not shown), and FIC101.PV is now published to all three subscribing stations 1001, 1003 and 1004 on Server C. No additional controller 1005 transactions are required.
3. Two operator stations 1007 and 1009 on Server A (not shown) now subscribe to FIC101.PV data. Because FIC101.PV is not in Server A's cache 1011, the system determines that FIC101.PV actually resides in Server C and subscribes to Server C. Because FIC101.PV is already in Server C's cache 1006, FIC101.PV data is now published on change to the three Server C operator stations subscribing it 1001, 1003 and 1004 as well as to Server A's cache 1011, which then publishes it to the two subscribing Server A operator stations 1007 and 1009. Again, no additional controller 1005 transactions are required.
4. Two operator stations on Server B (not shown) subscribe to "TI101.PV" data. The system determines that TI101.PV actually resides on Server C and subscribes to Server C. However, the TI101.PV data is not already in the Server C cache 1006, so Server C is prompted to subscribe to the attached controller 1005 for it.
5. When the operator station 1009 on Server A also subscribes to Server C for TI101.PV, it is already in the Server C cache and is simply published on change to all subscribing parties.

In this example, everything occurs automatically, dynamically, and transparently. On the operator station, a user can type in the name of a remote point (such as FIC101.PV or TI101.PV), request its point detail, and dynamically the data is subscribed (in some cases hundreds of parameters), and the detail display is called up and filled with current data. When the user or users are no longer interested in the data, the system de-subscribes, and, assuming that no other users are subscribing to the data, it is also dropped from the owning server's cache and from the owning controller's subscription list. This sequence of events occurs dynamically and without engineering intervention. Complete transparency of point location makes all points appear as if they are resident on the local server from an application or operator's point of view.

Compared with the statically configured prior art arrangements, the present invention's infrastructure is more akin to an inter-server nervous system. As stimulus for data is received, the entire system reacts, dynamically setting up the linkages to transmit the required information. When the system senses that the information is no longer required, the linkage is automatically broken down, resulting in the minimum possible loading on system resources at all times.

The two-tiered caching structure (i.e., local server, remote server) of the present invention minimises traffic on control networks and intersystem local- and wide-area networks, as well as the supervisory network/Ethernet connecting operator stations. In the preferred embodiment, all data in the architecture is published on change, and then only to subscribing parties. Each server cache eliminates duplicate subscriptions, resulting in an N-to-1 reduction in network traffic and system loading at each level in the architecture.

In one preferred embodiment, the server cache includes features and performs functions substantially as disclosed in U.S. Pat. No. 5,988,847 which was granted to Honeywell Inc. (Minneapolis) on 23 Nov. 1999. The disclosure of that patent is incorporated herein by reference for the purpose of understanding more fully the operation of the server cache. However, the disclosure of that patent is not admitted to be part of the prior art in relation to the present application for the purposes of novelty or inventiveness considerations.

The present invention provides a novel server architecture and method of communication that provides substantial advantages over prior art remote monitoring and control systems. In particular, the "on-demand" nature of communication between servers reduces the average band width required of the interconnecting network. For this reason, the invention is particularly amendable to optimisation for low band width/WAN environments. In the preferred form, the use caching of recently accessed data points to and their associated addresses further increases the speed of the system and reduces unnecessary searching. The ability to assign data points from different servers to a single logical area similarly increases the flexibility of the system as a whole. For all of these reasons, the present invention represents a commercially significant advance over prior art, remote monitoring and control systems.

The invention claimed is:

1. A system for remotely monitoring time variant data provided by a plurality of sensing devices, the system including:
   a) a plurality of remote servers each configured for allowing a remote operator to select a local data unit and to specify a parameter that is at least one of a rate of update and a condition relating to the data unit whereby, upon selection, the respective server is adapted to provide a command signal containing an identifier indicative of the selected local data unit, a subscriber field for identifying the remote server generating the command signal, and a subscription field for indicating the parameter, the remote servers also including respective remote server cache for containing one or more remote data units corresponding to selected local data units;
   b) a plurality of local servers each including a local server cache for containing one or more of the local data units designated by the identifiers, the local servers being responsive to the command signal, if the identifier corresponds to a data unit contained in the local server cache, for storing the subscriber field in the local cache and for pushing a data signal including the local data unit to the remote server identified in the subscriber field periodically based on the operator-specified parameter;
   c) a plurality of local controllers being responsive to the time variant data provided by the sensing devices for updating the local data units in the local cache; and
   d) a plurality of remote server processors associated with respective remote servers and which are responsive to the data signals addressed to the respective servers for updating a remote data unit to correspond with the selected local data unit.

2. A system according to claim 1 including a remote operating station associated with one of the remote servers for allowing a remote operator to access the local data units.

3. A system according to claim 1 including a plurality of remote operating stations associated with one of the remote servers for allowing a plurality of respective remote operators to access the local data units.

4. A system according to claim 3 wherein the remote server is adapted, upon operator selection of a local data unit, to determine whether one of the remote data units corresponds to the selected local data unit.

5. A system according to claim 1 wherein, upon operator selection of a local data unit, the remote servers are adapted to determine the local server to which the selected data unit is local and to store in the associated cache mapping information indicative of the location of said local data unit.

6. A system according to claim 5 wherein, upon operator selection of a local data unit, the remote servers are adapted to determine whether the remote server cache stores mapping information indicative of the local server to which the selected data unit is local.

7. A system according to claim 1 wherein, upon connection of a local server to the system, the local server is adapted to send to the remote servers information indicative of the data units local to it, including data point identifiers, and the remote servers are adapted to store mapping information indicative of the location of said local data units.

8. A system according to claim 1 wherein the plurality of remote servers are configured to allow an operator to specify a condition other than update time whereby upon selection the respective server of the data unit selected provides a command signal containing a subscription field indicating the specified condition.

9. A system according to claim 1 wherein the plurality of remote servers are configured to allow an operator to specify a temperature change value whereby upon selection the respective server of the data unit selected provides a command signal containing a subscription field indicating the temperature change.

10. A system according to claim 1, wherein the remote servers are adapted to allow respective remote operators to indicate that a local data unit is not required and, upon such an indication, to provide a command signal in which the subscription field indicates that the data unit is no longer required, and wherein the local server is adapted, upon receipt of such a command signal, to remove the subscriber field associated with said remote server from the local server cache, such that the local data unit is no longer pushed to the remote server.

11. A method of remotely monitoring time variant data provided by a plurality of sensing devices, the method including:
   a) at a local server, storing one or more local data units designated by local data unit identifiers;
   b) at a remote server, allowing a remote operator to select a local data unit and to specify a parameter including at least one of a rate of update and conditions relating to the data unit, and generating a command signal containing the identifier associated with the selected local data unit, a subscriber field for identifying the remote server generating the command signal, and a subscription field for indicating the parameter corresponding to the at least one of rate of update and the conditions;
   c) at the local server, responding to the command signal by pushing a data signal including the selected local data unit to the remote server identified in the subscriber field periodically based on the parameter;
   d) at the remote server, updating a remote data unit to correspond to the local data unit.

12. A method according to claim 11 including at a remote server, simultaneously allowing a plurality of remote operators access to the local data units.

13. A method according to claim 12 including at the remote server, upon operator selection of a local data unit, determining whether a remote data unit corresponds to the selected local data unit.

14. A method according to claim 11 including at a remote server, upon operator selection of a local data unit, determining the local server to which the selected data unit is local and storing in the associated cache mapping information indicative of the location of said local data unit.

15. A method according to claim 14 including, upon operator selection of a local data unit, determining whether the remote server cache stores mapping information indicative of the local server to which the selected local data unit is local.

16. A method according to claim 11 including at a local server, upon connection of said local server to a network of servers, sending to remote servers information indicative of the data units local to said local server, including data point identifiers; and, at the remote servers, storing mapping information indicative of the local of said local data units.

17. A method according to claim 11 including at a remote server, receiving at the remote server a condition other than update time whereby upon selection the respective server of the data unit selected provides a command signal containing a subscription field indicating the specified condition.

18. A method according to claim 11 including at a remote server, receiving a specification of a temperature change value whereby upon receipt of the temperature change value, the respective server of the data unit selected provides a command signal containing a subscription field indicating the temperature change.

19. A method according to claim 11 wherein the remote servers allow respective remote operators to indicate that a local data unit is not required and, upon such an indication, to provide a command signal in which the subscription field indicates that the data unit is no longer required, and wherein the local server, upon receipt of such a command signal, removes the subscriber field associated with said remote server from the local server cache, such that the local data unit is no longer pushed to the remote server.

\* \* \* \* \*

UNITED STATES PATENT AND TRADEMARK OFFICE
CERTIFICATE OF CORRECTION

PATENT NO. : 7,376,712 B1 Page 1 of 1
APPLICATION NO. : 10/111125
DATED : May 20, 2008
INVENTOR(S) : David B. Granatelli and Michael David Higgins It is certified that error appears in the above-identified patent and that said Letters Patent is hereby corrected as shown below:

Title page, item [75] enter as follows

Granatelli; David B. (~~Lilyfield~~ Balmain, AU), Higgins; Michael David (Applecross, AU)

Signed and Sealed this

Fifth Day of August, 2008

JON W. DUDAS
*Director of the United States Patent and Trademark Office*